United States Patent [19]

Pedain et al.

[11] Patent Number: 5,252,671
[45] Date of Patent: Oct. 12, 1993

[54] COATING COMPOSITIONS FOR COATINGS THAT ARE PERMEABLE TO WATER VAPOR AND A PROCESS FOR THEIR PREPARATION

[75] Inventors: Josef Pedain; Klaus Noll, both of Cologne; Wilhelm Thoma, Leverkusen; Detlef-Ingo Schütze, Cologne, all of Fed. Rep. of Germany

[73] Assignee: Bayer Aktiengesellschaft, Leverkusen, Fed. Rep. of Germany

[21] Appl. No.: 887,213

[22] Filed: May 21, 1992

[30] Foreign Application Priority Data

Jun. 1, 1991 [DE] Fed. Rep. of Germany ....... 4118053

[51] Int. Cl.$^5$ ............................................. C08F 8/30
[52] U.S. Cl. ................................... 525/124; 525/127; 525/458; 528/904; 524/840; 427/389.9
[58] Field of Search ............... 525/127, 124, 458; 528/904; 524/840; 427/389.1

[56] References Cited

U.S. PATENT DOCUMENTS

| | | | |
|---|---|---|---|
| 3,634,544 | 1/1972 | Takeda et al. | 260/858 |
| 3,687,715 | 8/1972 | Kigane et al. | 117/76 R |
| 3,984,607 | 10/1976 | Thoma et al. | 428/425 |
| 4,035,213 | 7/1977 | Thoma et al. | 156/231 |
| 4,248,756 | 2/1981 | König et al. | 260/31.2 N |
| 4,367,327 | 1/1983 | Holker et al. | 528/61 |
| 4,743,470 | 5/1988 | Nachtkamp et al. | 427/246 |
| 4,935,485 | 6/1990 | Pedain | 528/45 |
| 5,151,240 | 9/1992 | Asano | 264/284 |

FOREIGN PATENT DOCUMENTS

| | | |
|---|---|---|
| 100005 | 2/1984 | European Pat. Off. . |
| 122554 | 10/1984 | European Pat. Off. . |
| 1220384 | 7/1966 | Fed. Rep. of Germany . |
| 1226071 | 10/1966 | Fed. Rep. of Germany . |
| 58-057420 | 4/1983 | Japan . |
| 59-036781 | 2/1984 | Japan . |
| 61-009423 | 1/1986 | Japan . |
| 1288401 | 9/1972 | United Kingdom . |

*Primary Examiner*—James J. Seidleck
*Assistant Examiner*—Mary Critharis
*Attorney, Agent, or Firm*—Joseph C. Gil; Richard E. L. Henderson

[57] ABSTRACT

The present invention relates to coating compositions containing (A) 70 to 98% by weight, based on the sum of components (A) and (B), of
  (a) isocyanate-free polymers of ethylenically unsaturated monomers and/or polyurethanes or blocked isocyanate prepolymers, and
  (b) optional organic solvents,
  wherein component (A) contains no significant quantities of groups capable of reacting with component (B) or starting materials thereof and has a viscosity (at 23° C.) of 2000 to 100,000 mPa.s;

(B) 2 to 30% by weight, based on the sum of components (A) and (B), of a polyaddition product prepared in and dispersed in component (A), wherein the polyaddition product is a polyurethane, polyurethane urea, polyurea, or mixture thereof, containing ionic groups and/or potentially ionic groups in a quantity corresponding to from 0.5 to 20 milliequivalents per 100 g of component (B) but containing substantially no free isocyanate, hydroxyl, or amino groups: and (C) optional cross-linking agents;

in which component (B) is formed in situ in component (A).

7 Claims, No Drawings

COATING COMPOSITIONS FOR COATINGS THAT ARE PERMEABLE TO WATER VAPOR AND A PROCESS FOR THEIR PREPARATION

BACKGROUND OF THE INVENTION

The present invention relates to coating compositions suitable for the production of coatings that are permeable to water vapor. These compositions contain (A) film-forming polymers that may carry reactive groups, (B) hydrophilic polyaddition products dispersed in component (A) selected from polyurethanes, polyureas, and polyurethane ureas, and, optionally, (C) cross-linking agents.

The preparation of polyurethane-based coatings that are permeable to water vapor is known and is carried out mainly by physical manipulations. To produce these coatings, the polyurethane is dissolved in a solvent and applied as a layer to a substrate or a separating support and the resultant layered composition is passed in the wet state through a bath containing a substance that is miscible with the solvent but is a non-solvent for the polyurethane. The non-solvent enters the solution layer, in which the polyurethane gradually precipitates. When the resultant solidified film is dried, the solvent which escapes, as well as the non-solvent, leave behind microchannels that are then available in the coating for the transport of water vapor.

Coatings having microcavities can be similarly produced by the addition of powders of water-soluble salts to polymer solutions. After formation of the coatings, the salt can be washed out with water, leaving behind microcavities.

The perforation of compact polymer films by means of high energy electron radiation produces films with high permeability to water vapor which can be laminated. This method, however, requires very expensive apparatus.

A variation of the microporous coating technique that dispenses with the complicated immersion bath technology but produces substantially the same results has recently been carried out. In this process—also known as "evaporation coagulation"—water is added to the solution of the polymer in a low boiling organic solvent in such quantity that the resultant spreadable paste still has just sufficient stability and can be applied. Upon evaporation, the organic solvent is first eliminated, and the water (which progressively increases proportionately) precipitates the polymer as in the immersion process and finally escapes upon drying to leave a microporous structure in the film.

The immersion bath processes have the same major disadvantage as evaporation coagulation in that microchannels or microcavities weaken the water vapor-permeable coatings. Consequently, the coatings have distinctly lower tensile strength and abrasion resistance than a solid film.

No shortage of attempts have, therefore, been made to produce permeability to water vapor in a coating not only by applying physical methods but also by chemical means. Thus, for example, it has already been proposed to produce such coatings with polyurethanes consisting partly of water-soluble or hydrophilic starting components.

Thus, German Offenlegungsschriften 1,220,384 and 1,226,071 describe polyurethane coating compositions in which polyurethanes have been prepared from glycols, diisocyanates, and polyethylene glycols having molecular weights of about 1000.

Polyethylene glycols may also be used as diol components in polyester polyols for polyurethane elastomers with a view to producing coatings which are permeable to water vapor and have little tendency to swell in water, as disclosed in Japanese Patent Application 61/009,423.

Compact top coats on composite materials of textile substrates and microporous coatings such as described in German Offenlegungsschrift 2,020,153 are also permeable to water vapor.

Segmented polyurethane elastomers of polyethylene glycols are disclosed in European Patent Application 52,915.

Other organic hydrophilic components have also been added to polyurethanes to produce composite materials and coatings which are permeable to water vapor. In particular, poly-γ-methylglutamate may be added to polyurethanes, used either as starting components or applied to the polyurethanes by dripping. The numerous literature references describing this use include German Offenlegungsschriften 1,922,329 and 1,949,060 and Japanese Patent Applications 58/057,420 and 59/036,781.

The substances which have recently acquired particular technical interest in the field of compact coatings that are permeable to water vapor are mainly polyurethanes which contain the above-mentioned polyethylene glycols as starting components. These raw materials are inexpensive, generally available, and technically easily obtainable. The polyurethanes and polyurethane ureas obtained from these materials are also generally well known. In contrast to the widely used polyurethanes and polyurethane ureas that contain polyester diols, polycarbonate diols, or polyether diols as relatively high molecular weight diols, the above-mentioned polyurethanes are water absorbent, permeable to water vapor, and in some cases even highly swellable or soluble in water. Hydrophobic polyols are therefore added to the polyethylene glycols which cause the hydrophilic character. These mixtures can be considered as an attempt to produce polyurethanes and polyurethane ureas that combine good permeability to water vapor with high resistance to the effects of liquid water.

German Offenlegungsschrift 2,902,090 and U.S. Pat. No. 4,248,756 describe two-component coating compositions of ketoxime-blocked prepolymers and dinuclear, cycloaliphatic diamines as cross-linking agents that are prepared with at most 15% by weight of solvent. The polyhydroxyl compounds may, for example, contain polypropylene oxides and, optionally, also ethylene oxide units incorporated in the blocked prepolymers.

Blocked prepolymers described in European Patent Application 100,005 obtained from polyhydroxyl compounds containing from 20 to 100% by weight (preferably from 40 to 80% by weight) of ethylene oxide units give rise to coatings with good permeability to water vapor after they have been applied to textile substrates and cured. Due to swelling of these layers in water, however, pustule-like swellings appear when discrete droplets of water are placed on the layer. These pustules are not only aesthetically displeasing in a textile or leather (or leather-like) article of use but are also a serious technical defect.

It was surprisingly found that coatings that are permeable to water vapor but have very little tendency to swell in water can be obtained by using coating compositions consisting of polymers that are normally hydrophobic but contain dispersed hydrophilic organic fillers. These coating compositions may be obtained by preparing a hydrophilic organic filler in situ in a blocked NCO-prepolymer or in a completed polyurethane or a polymer.

SUMMARY OF THE INVENTION

The present invention relates to a process for the preparation of coating compositions comprising preparing a mixture of (A) about 70 to about 98% by weight (preferably 80 to 96% by weight), based on the sum of components (A) and (B), of
  (a) one or more polymers selected from the group consisting of
    (1) polymers of ethylenically unsaturated monomers and
    (2) polyurethanes or blocked isocyanate prepolymers, and
  (b) optionally, organic solvents,
  wherein component (A) contains no free isocyanate groups and no significant quantities of groups capable of reacting with component (B) or with starting materials of component (B) and has a viscosity (determined at 23° C.) of about 2000 to about 100,000 mPa.s (preferably from 5000 to 70,000 and more preferably from 10,000 to 50,000 mPa.s), and wherein the ratio by weight of (a):(b) is from 100:0 to about 5:95;
(B) about 2 to about 30% by weight (preferably 4 to 20% by weight), based on the sum of components (A) and (B), of a polyaddition product prepared in and dispersed in component (A), wherein said polyaddition product is a polyurethane, a polyurethane urea, or a polyurea, or a mixture thereof, containing hydrophilic groups selected from ionic groups and potentially ionic groups in a quantity corresponding to from 0.5 to 20 (preferably from 1 to 14) milliequivalents per 100 g of component (B) but containing substantially no free isocyanate, hydroxyl, or amino groups; and
(C) optionally, cross-linking agents;
by forming component (B) in situ in component (A).

DETAILED DESCRIPTION OF THE INVENTION

Preferred polymers (a)(1) for the process according to the invention include, preferably, hydroxyl group-containing (meth)acrylate resins capable of cross-linking with other substances and having number average molecular weights $M_n$ of from 500 to 2000 (preferably from 500 to 1600) and an average functionality (per molecule) greater than about 1 (preferably greater than 2).

Preferred ethylenically unsaturated monomers for the preparation of such hydroxyl group-containing (meth)acrylate resins include, for example, I. hydroxyalkyl (meth)acrylates and at least one monomer selected from groups II to IV (below),
II. styrene and/or methyl methacrylate,
III. (meth)acrylates, and
IV. $\alpha,\beta$-monoolefinically unsaturated carboxylic acids.

Particularly preferred (meth)acrylate resins may be prepared from

I. 10 to 50 parts by weight of a hydroxyalkyl ester of acrylic acid or methacrylic acid having 2 to 4 carbon atoms in the hydroxyalkyl group, or mixtures thereof;
II. 0 to 80 parts by weight of styrene, $\alpha$-methylstyrene, o-chlorostyrene, p-chlorostyrene, o-, m- or p-methylstyrene, p-tert-butylstyrene, or methyl methacrylate, or mixtures thereof;
III. 10 to 90 parts by weight of an acrylic acid ester having 1 to 12 carbon atoms in the alcohol moiety or of a methacrylic acid ester having 2 to 12 carbon atoms in the alcohol moiety or mixtures thereof;
IV 0 to 50 parts by weight of an $\alpha,\beta$-monoolefinically unsaturated mono- or dicarboxylic acid having 3 to 5 carbon atoms or of a maleic acid semiester having 2 to 14 carbon atoms in the alcohol moiety or mixtures thereof, or their products of reaction with a monoglycidyl compound, the sum of the parts by weight of I, II, III, and IV amounting to 100 and the preparation of these (meth)acrylate resins being carried out by radical copolymerization either solvent-free or in an organic solvent.

Compounds suitable for the preparation of such (meth)acrylate resins include in particular I. from 20 to 50 parts by weight of 2-hydroxyethyl acrylate, 2-hydroxyethyl methacrylate, 2-hydroxypropyl acrylate, 2-hydroxypropyl methacrylate, 4-hydroxybutyl acrylate, or 4-hydroxybutyl methacrylate, or mixtures thereof;
II. from 30 to 70 parts by weight of styrene or methyl methacrylate or mixtures thereof;
III. from 9.5 to 30 parts by weight of butyl acrylate, butyl methacrylate, 2-ethylhexyl acrylate, or 2-ethylhexyl methacrylate, or mixtures thereof; and
IV. from 0.5 to 20 parts by weight of acrylic acid, methacrylic acid, or maleic acid semiesters having 4 to 8 carbon atoms in the alcohol component;

or

I. from 25 to 50 parts by weight of 4-hydroxybutyl acrylate, 4-hydroxybutyl methacrylate, 2-hydroxyethyl acrylate, 2-hydroxyethyl methacrylate, 2-hydroxypropyl acrylate, 2-hydroxypropyl methacrylate, or mixtures thereof;
III. from 40 to 74.9 parts by weight of butyl acrylate, butyl methacrylate, 2-ethylhexyl acrylate, or 2-ethylhexyl methacrylate, or mixtures thereof; and
IV. from 0.1 to 10 parts by weight of acrylic acid, methacrylic acid, or maleic acid semiesters having 4 to 8 carbon atoms in the alcohol component;

or

I. from 10 to 30 parts by weight of 2-hydroxyethyl acrylate, 2-hydroxyethyl methacrylate, 2-hydroxypropyl acrylate, 2-hydroxypropyl methacrylate, 4-hydroxybutyl acrylate, or 4-hydroxybutyl methacrylate, or mixtures thereof;
II. from 0 to 70 parts by weight of styrene or methyl methacrylate or mixtures thereof;
III. from 0 to 30 parts by weight of butyl acrylate, butyl methacrylate, 2-ethylhexyl acrylate, or 2-ethylhexyl methacrylate, or mixtures thereof; and
IV. from 10 to 50 parts by weight of a reaction product of monoglycidyl compounds with acrylic acid, methacrylic acid, or maleic acid semiesters having 4 to 8 carbon atoms in the alcohol component or mixtures thereof;

the parts by weight of I, II, III, and IV adding up to 100.

Such (meth)acrylate resins generally have a hydroxyl group content of from 2 to 7.5% by weight. They are described, for example, in German Offenlegungsschrift 2,460,329.

The polyurethanes (a) (2) may be prepared in known manner, either solvent-free or, preferably, in an organic solvent, either by the so-called one-shot process or via an isocyanate prepolymer. In the last-mentioned variation, the isocyanate groups of the prepolymer are blocked; if set free by deblocking, the isocyanate groups of the prepolymer can be reacted with chain extenders, preferably polyamines.

Polyurethanes (a)(2), including the above-mentioned prepolymers, are prepared from diisocyanates of the formula Q(NCO)₂, in which Q stands for an aliphatic hydrocarbon group having 4 to 12 carbon atoms, a cycloaliphatic hydrocarbon group having 6 to 15 carbon atoms, an aromatic hydrocarbon group having 6 to 15 carbon atoms, or an araliphatic hydrocarbon group having 7 to 15 carbon atoms. Examples of preferred such diisocyanates include tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-dicyclohexylpropane-(2,2), 1,4-diisocyanatobenzene, 2,4- and 2,6-diisocyanatotoluene, 2,4'- and 4,4'-diisocyanatodiphenylmethane, 4,4'-diisocyanato-diphenylpropane(2,2), p-xylylene diisocyanate, and α,α-,α',α'-tetramethyl-m- or -p-xylylene diisocyanate, and mixtures of these compounds.

Aromatic polyisocyanates described in some detail in U.S. Pat. Nos. 3,984,607 and 4,035,213, German Offenlegungsschrift 2,402,840, and German Auslegeschrift 2,457,387 are preferred. Especially preferred are 2,4'- and 4,4'-diisocyanatodiphenylmethane, the isomeric toluene diiocyanates, and, preferably, mixtures of these diisocyanates.

Particularly suitable reactants for use with these polyisocyanates are polyhydroxyl compounds having from 2 to about 8 (preferably 2 or 3) hydroxyl groups per molecule and an (average) molecular weight of up to about 10,000 (preferably up to 6,000). Both low molecular weight polyhydroxyl compounds having molecular weights of from 62 to 499 and relatively high molecular weight polyhydroxyl compounds having average molecular weights of at least 500 (preferably not less than 1000) of the type described in the above-mentioned publications may be used.

Low molecular weight polyhydroxyl compounds ("chain extenders") include a wide variety of diols such as for example, a) alkane diols such as ethylene glycol, propylene 1,3-glycol and propylene 1,2-glycol, butane-1,4-diol, pentane-1,5-diol, dimethylpropane-1,3-diol, and hexane-1,6-diol;
b) ether diols such as diethylene glycol, triethylene glycol, or 1,4-phenylene bis(β-hydroxyethyl ether);
c) ester diols corresponding to the general formulas

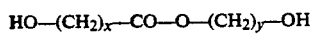

HO—(CH₂)ₓ—CO—O—(CH₂)ᵧ—OH and

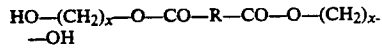

HO—(CH₂)ₓ—O—CO—R—CO—O—(CH₂)ₓ—OH in which
R denotes an alkylene or arylene group having 1 to 10 (preferably 2 to 6) carbon atoms,
x is 2 to 6, and
y is 3 to 5,
for example, δ-hydroxybutyl-ε-hydroxycaproic acid esters, ω-hydroxyhexyl-γ-hydroxybutyric acid esters, adipic acid β-hydroxyethyl ester, and terephthalic acid bis(β-hydroxyethyl)ester.

Polyamines may also be used as "chain extenders", especially aliphatic or aromatic diamines, for example, ethylenediamine, propylene-1,2- and -1,3-diamine, tetramethylene-1,4-diamine, hexamethylene-1,6-diamine, N,N'-diisobutyl-hexamethylene-1,6-diamine, undecamethylene-1,11-diamine, cyclohexane-1,3- and -1,4-diamine and mixtures thereof, 1-amino-3,3,5-trimethyl-5-aminomethylcyclohexane, 2,4-and 2,6-hexahydrotoluene diamine and mixtures thereof, perhydro-2,4'- and 4,4'-diaminodiphenylmethane and its 3,3'-dimethyl derivative, bis(3-aminopropyl)methylamine, p-xylylenediamine, bis-anthranilic acid esters according to German Offenlegungsschriften 2,040,644 and 2,160,590, 3,5- and 2,4-diaminobenzoic acid esters according to German Offenlegungsschrift 2,025,900, the ester group-containing diamines described in German Offenlegungsschriften 1,803,635, 2,040,650, and 2,160,589, 3,3'-dichloro-4,4'-diamino-diphenylmethane, toluenediamine, 4,4'-diamino-diphenylmethane, and 4,4'-diamino-diphenyl disulfide.

Diamines suitable for the purpose of this invention also include hydrazine, hydrazine hydrate, and substituted hydrazines, such as methyl hydrazine, N,N'-dimethylhydrazine, and their homologs and acid dihydrazides, such as carbodihydrazide, oxalic acid dihydrazide, the dihydrazides of malonic acid, succinic acid, glutaric acid, adipic acid, β-methyladipic acid, sebacic acid, hydracrylic acid, and terephthalic acid, semicarbazido-alkylene hydrazides such as β-semicarbazido-propionic acid hydrazide (German Offenlegungsschrift 1,770,591), semicarbazidoalkylene carbazic esters, such as 2-semicarbazido ethyl carbazic ester (German Offenlegungsschrift 1,918,504), and amino-semicarbazide compounds such as β-aminoethyl-semicarbazido carbonate (German Offenlegungsschrift 1,902,931).

Examples of relatively high molecular weight polyhydroxyl compounds include the hydroxypolyesters, hydroxypolyethers, hydroxypolythioethers, hydroxypolyacetals, hydroxypolycarbonates, and/or hydroxypolyester amides known in polyurethane chemistry, especially those having average molecular weights of from about 600 to about 4000 (most preferably those having average molecular weights of from 800 to 2500). Polyether polyols and polyester polyols are particularly preferred. Particularly preferred are propylene oxide polyethers having an average of 2 to 3 hydroxyl groups per molecule and optionally containing polyethylene oxide units, as well as hydroxypolyesters with melting points below 60° C. having 2 or 3 hydroxy end groups and an average molecular weight of from about 1000 to about 6000.

Suitable hydroxyl group-containing polyesters include, for example, the reaction products of polyhydric (preferably dihydric) alcohols, optionally together with trihydric alcohols, with polybasic (preferably dibasic) carboxylic acids. Instead of the free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic, and/or heterocyclic and may be substituted (for example, by halogen atoms) and/or unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, terephthalic acid dimethyl ester, and terephthalic acid bisglycol ester. Suitable polyhydric alcohols include ethylene glycol, propylene glycol-(1,2) and -(1,3), butylene glycol-(1,4) and -(2,3), hexane-1,6-diol, octane-1,8-diol, neopentyl glycol, cyclohexanedimethanol, (i.e., 1,4-bis(-hydroxymethyl)cyclohexane), 2-methyl-1,3-propanediol, glycerol, trimethylolpropane, hexane-1,2,6-triol, butane1,2,4-triol, trimethylolethane, pentaerythritol, quinitol, mannitol and sorbitol, methylglycoside, diethylene glycol, triethylene glycol, tetraethylene glycol, dipropylene glycol, dibutylene glycol, and polybutylene glycols.

Mixtures of the above-mentioned polyether polyols with polyester polyols having average molecular weights of from 1000 to 3000 obtained from adipic acid, hexane-1,6-diol and neopentyl glycol are also particulary preferred.

Low molecular weight polyols having a molecular weight of less than about 300 of the type known as chain lengthening agents may be included in the preparation of the isocyanate prepolymers. Among these, butane-1,4-diol and trimethylolpropane are preferred.

Preparation of the blocked isocyanate prepolymers may be carried out in known manner by reacting the above-mentioned polyhydroxyl compounds with excess diisocyanate at about 70° to about 100° C. An NCO/OH ratio of from about 1.5:1 to about 6.0:1 (preferably from 1.7:1 to 2.5:1) is generally chosen for this reaction.

Examples of suitable blocking agents for the isocyanate prepolymers include ketoximes of hydroxylamine and ketones such as acetone, methyl ethyl ketone, diethyl ketone, cyclohexanone, acetophenone, and benzophenone. Methyl ethyl ketone oxime (i.e., butanone oxime) is a preferred blocking agent. Other blocking agents are in principle also suitable, for example, those described in *Methoden der Organischen Chemie*, (Houben-Weyl), Volume 14/2, 4th Edition, Georg Thieme Verlag, Stuttgart (1963), pages 61 et seq.

The blocking reaction may be carried out by reacting the isocyanate prepolymer with equivalent quantities of blocking agent at an elevated temperature (e.g., at about 70° to about 100° C.) until the isocyanate groups have disappeared. Such blocked isocyanate prepolymers have been described, for example, in German Offenlegungsschrift 2,902,090.

The blocked prepolymers may be mixed with organic solvents to adjust them to an optimum viscosity. Because the isocyanate groups are blocked, the solvent used need not necessarily be inert towards free isocyanate groups. Examples of suitable solvents include alcohols such as isopropyl alcohol, ethers such as ethylene glycol monomethyl and monoethyl ether, esters such as ethyl and butyl acetate and the acetic acid esters of ethylene glycol monomethyl and monoethyl ether, ketones such as methyl ethyl ketone and cyclohexanone, and amides such as N,N-dimethylformamide, N,N-dimethylacetamide, and N-methylpyrrolidone.

The cross-linking component (C) for the blocked isocyanate prepolymers may in principle be any polyfunctional compound capable of reacting with the blocked isocyanate groups (after they have been deblocked), especially, therefore, polyamines (preferably diamines such as those described above as chain lengthening agents). Isophorone diamine, among others, is also suitable. A preferred diamine is 4,4'-diamino-3,3'-dimethyl-dicyclohexylmethane, which is an aliphatic diamine that is liquid at room temperature and has a very low vapor pressure.

The blocked isocyanate prepolymers are generally mixed with the cross-linking agent in approximately equivalent weights of these components, although sub-cross-linking may be suitable for certain purposes. The equivalent ratio of blocked isocyanate groups to cross-linking groups (preferably $NH_2$) is, therefore, generally from about 1.35:1 to about 0.95:1 (preferably from 1.25:1 to 1:1).

The capacity for film formation is common to the sub-groups of compound (A). It is advisable, especially in the case of components (a)(2), to dissolve them in an organic solvent if they have not already been prepared in such a solvent. These solutions may have a solids content of from about 10 to about 95% by weight (preferably from 20 to 50% by weight). High solids contents are possible especially when prepolymers (a)(2) are used. Suitable solvents include aromatic solvents such as toluene and xylenes and the solvents listed above with respect to the blocked prepolymers.

Ionic groups for component (B) include alkali metal and ammonium carboxylate and sulfonate groups. Potentially ionic groups (that is, groups that can be ionized) include the carboxyl group and the sulfo group. Suitable components for the introduction of these groups into component (B), therefore, include dihydroxycarboxylic acids, diaminocarboxylic acids, dihydroxy sulfonic acids, and diaminoalkylsulfonic acids and their salts, for example, dimethylol-propionic acid, ethylene diamino-β-ethylsulfonic acid, ethylene diaminopropyl- and -butylsulfonic acid, 1,2- and 1,3-propylene diamino-β-ethylsulfonic acid, lysine, 3,5-diaminobenzoic acid, and their alkali metal and/or ammonium salts, as well as the adduct of sodium bisulfite and 2-butene-1,4-diol.

Component (B) may be prepared by the methods known for polyurethane chemistry, including both the one-shot process and the two-stage process (i.e., prepolymer process).

Component (B) is thus prepared in situ in component (A) substantially from aliphatic, cycloaliphatic, and/or aromatic polyisocyanates on the one hand and diols, diamines, and/or hydrazine on the other hand, using the starting components which give rise to the ionic groups or the potentially ionic groups for component (B). This process may be carried out by, for example, the following method.

One or more compounds containing amino groups are first dissolved in component (A). These amino compounds may be diamines such as ethylene diamine, hexamethylene diamine, isophorone diamine, 4,4'-diamino-dicyclohexylmethane, 4,4'-diamino-3,3'-dimethyl-dicyclohexylmethane. Hydrazine hydrate and its derivatives, such as carbodihydrazide or semicarbazido-propionic acid hydrazide, may also be used. Hydrazide hydrate is preferred.

Component (B) is then produced in situ by adding polyisocyanates, preferably in equivalent quantity, to the amino group-containing compounds dissolved in component (A). A solid polyurea is thus produced as a dispersed phase. The polyisocyanates used may be the compounds described above for the preparation of component (a) (2).

The hydroxy functional components should preferably be converted into isocyanate prepolymers by reaction with isocyanate components before they are used in order to ensure a short reaction time with the amine components.

Suitable isocyanate components for the preparation of component (B) are the polyisocyanates described above as suitable for the preparation of component (A). Suitable OH-functional components for the preparation of component (B) are the polyhydric alcohols described above for the preparation of component (A), provided they do not contain any more than 2 ethoxy groups per molecule, i.e. for example ethylene glycol, 1,2- and 1,3-propylene glycol, 1,4- and 2,3-butylene glycol, 1,6-hexanediol, 1,8-octanediol, neopentylglycol, cyclohexanedimethanol (1,4-bis-hydroxymethylcyclohexane), 2-methyl-1,3-propanediol, glycerol, trimethylolpropane, 1,2, hexanetriol, 1,2,4-butanetriol, trimethylolethane, pentaerythritol, quinitol, mannitol and sorbitol, methyl glycoside, as well as diethylene glycol. The hydroxyfunctional components for the preparation of component B also include the starting products which give rise to the ionic or potentially ionic groups.

The viscosity of component (A) is important for the process according to the invention. If the viscosity is below about 2000 mPa's, long term stable distribution of the disperse component (B) cannot be ensured. Instead, deposition of the solid takes place. This deposition may occasionally be irreversible but in any case requires redistribution by stirring. A viscosity above about 100,000 mPa's, on the other hand, gives rise to difficulties in incorporating the components required for the formation of component (B). Moreover, the formation of substantial quantities of component (B) leads to a further increase of viscosity so that workup of the coating composition becomes increasingly difficult.

If hydroxyl group-containing polymers (e.g., hydroxyl group-containing poly(meth)acrylates are used as component (a) (1), these may still be cross-linked on the substrate if an effective cross-linking agent is added to the coating composition. Suitable cross-linking agents for this purpose include blocked or free polyisocyanates or aminoplast resins. Melamine/formaldehyde and urea/formaldehyde condensation products, for example, are to be regarded as aminoplast resins. Melamine resins include all conventional melamine/formaldehyde condensates that are either not etherified or etherified with saturated monohydric alcohols having 1 to 4 carbon atoms, as described, for example, in French Patent 943,411 or by D. H. Solomon in *The Chemistry of Organic Filmformers*, 235-240, John Wiley & Sons, Inc., New York (1967). The melamine resins may be partly or completely replaced by other cross-linking aminoplasts such as described, for example, in *Methoden der Organischen Chemie* (Houben-Weyl), Volume 14/2, Part 2, 4th Edition, Georg Thieme Verlag, Stuttgart (1963), 319 et seq.

An OH/NCO equivalent ratio of from about 1:0.8 to about 1:1.2 is generally employed when polyisocyanate cross-linking agents are used and a ratio by weight of OH polymer to aminoplast resin of from about 65:35 to about 95:5 is generally employed when aminoplast resins are used as cross-linking agents.

The invention further relates to the coating compositions obtainable by the process according to the invention.

The coating compositions according to the invention may be used in particular for coating textiles, especially textile sheet products, and leather. The use of the coating compositions according to the invention for coating textiles and leather is therefore a further object of this invention.

The coating compositions according to the invention may be used to produce coatings that are permeable to water vapor in conventional coating installations designed both for the direct and the reversal coating process. Layers with differing properties (e.g. bonding layers, interlayers or top coat layers) may be produced by these methods, depending on the given specific chemical structure of the polymer.

A reversal coating may be produced from the coating compositions according to the invention by, for example, first applying the material for the top coat to a suitable intermediate support (e.g., a separating paper) in a quantity of about 20 to about 100 g/m$^2$, and then hardening this material in a drying tunnel, applying a coating composition of the invention for the priming layer to the dried top layer, again in a quantity of from 20 to 100 g/m$^2$, laminating the substrate thereto, drying or curing the coating in another drying tunnel at about 120° to 190° C. (preferably at 150° to 160° C.), and stripping the coated substrate from the separating support.

The coating compositions according to the invention may, of course, be used for producing only the top coat or only the primer coat and a conventional coating composition or other coating system which is permeable to water vapor may then be used for the other coat.

As already mentioned, the coating compositions according to the invention may also be applied directly to a textile substrate by the direct coating process.

The coating compositions according to the invention may be blended with one-component or two-component polyurethanes in solution or dispersion. See, e.g., German Offenlegungsschriften 2,457,387 and 3,134,161. The polyurethanes used for this purpose may be hydrophobic or hydrophilic.

If the coating compositions according to the invention are used for producing interlayers, compositions which release gases when heated may be added as blowing agents, and foam stabilizers may also be added. Suitable additives are described, for example, in German Offenlegungsschrift 1,794,006 (British Patent 1,211,339) and in U.S. Pat. No. 3,262,805.

The advantages of the present invention may be summarized as follows:

(1) high permeability to water vapor, measured by the method of British Textile Technology Group (BTTG);
(2) great imperviousness to water of the coated articles in the original state, after washing and/or after dry cleaning;
(3) excellent "resistance to droplets", that is, no "pustular" swelling occurs when water droplets lie on the coating;
(4) low abrasion of the compact coating surface;
(5) elimination of environmentally polluting precipitation bath liquids such as occur when DMF solutions coagulate in water; and
(6) normal spread coating, knife coating, and dry techniques in contrast to the difficult spread coating and drying conditions required for the production of microporous layers permeable to water vapor by the process of evaporation coagulation.

The term "no significant quantities" in the definition of component (A) means "substantially none" in the sense that only the quantities which are inevitable formed as end groups when correctly treated are included.

The term "average molecular weight" in the context of this invention refers to the number average molecular weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The ratios mentioned for the following starting products are molar ratios. The following compounds are used in the Examples:

Prepolymer 1: a branched isocyanate prepolymer blocked with butanone oxime and obtained from MDI and TDI (1:1), a trifunctional propylene oxide polyether having an average molecular weight of about 6000, and a difunctional propylene oxide polyether having an average molecular weight of about 600.

Prepolymer 2: an isocyanate prepolymer blocked with butanone oxime and obtained from MDI, a difunctional propylene oxide polyether having an average molecular weight of about 2000, a trifunctional propylene oxide polyether having an average molecular weight of about 3000, and an adipic acid/hexane-1,6-diol/neopentyl glycol polyester (hexane-1,6-diol/neopentyl glycol=2:1) having an average molecular weight of about 2000.

Polyacrylate solution 3: a 40% solution of a polyacrylate of acrylic acid ethyl ester, acrylic acid, and methacrylic acid hydroxy propyl ester (25:2.5:2.5) in ethyl acetate.

Polyurethane solution 4: a 30% solution of a polyurethane of MDI, tetraethylene glycol/hexane-1,6-diol polycarbonate (tetraethylene glycol/hexane-1,6-diol=2:3) having an average molecular weight of about 2000, a difunctional ethylene oxide/propylene oxide (1:1) polyether, and butane-1,4-diol in dimethylformamide and toluene.

Polyurethane urea solution 5: a 30% solution of a polyurethane urea of IPDI and HDI (2:1), tetraethylene glycol/hexane-1,6-diol (2:3) polycarbonate having an average molecular weight of about 2000, isophorone diamine, and hydrazine in toluene, isopropyl alcohol, and methoxypropanol.

EXAMPLE 1

612.2 parts of the blocked prepolymer 1 were mixed with 8.75 parts of hydrazine hydrate and 73.85 parts of a 45% aqueous solution of the sodium salt of 2-(2-aminoethyl)aminoethanesulfonic acid at room temperature. 77.7 parts of isophorone diisocyanate were slowly added dropwise to this mixture at room temperature with thorough stirring. The clear mixture gradually became cloudy as the isophorone diisocyanate was added. After further stirring for two hours, the isocyanate content (determined by IR spectroscopy) had fallen to zero. A stable, white dispersion containing 13.8% of the hydrophilic polyurea in the blocked isocyanate prepolymer was obtained.

EXAMPLE 2

A hydrophilic polyurea was prepared as described in Example 1 in 612.2 parts of blocked prepolymer 1 from 10.2 parts of hydrazine hydrate, 38.8 parts of the aqueous solution of sodium salt described in Example 1, and 71 parts of a mixture of 80% of 2,4- and 20% of 2,6-diisocyanatotoluene. The white dispersion obtained contained 13.4% of the hydrophilic urea.

The dispersions of Examples 1 and 2 and prepolymer 1 were mixed with the quantities of 3,3'-dimethyl-4,4'-diamino-dicyclohexylmethane indicated in Table 1 and applied to a silicone treated separating paper by means of a coating knife. The films were completely cured after a heat treatment in the drying tunnel (160° C./5 minutes) and could be stripped from the separating support. The cured material had the weights per unit area indicated in Table 1. The permeabilities to water vapor were determined under the conditions set forth in the publications DS 2109 TM 1 of the British Textile Technology Group, Manchester, England.

TABLE 1

|  | Diamine | Application | Permeability | to waver vapor |
|---|---|---|---|---|
|  | (Parts) | (Parts) | (g/m$^2$) | (g/m$^2$ · d) |
| Prepolymer 1 | 100 | 6.2 | 39 | 1800 |
|  | 100 | 6.2 | 63 | 1300 |
| Example 1 | 100 | 5.3 | 39 | 3100 |
|  | 100 | 5.3 | 63 | 2100 |
| Example 2 | 100 | 5.3 | 32 | 2900 |
|  | 100 | 5.3 | 61 | 1700 |

EXAMPLE 3

A stable dispersion of the solids present was prepared by the method described in Example 1 in 500 parts of the blocked prepolymer 2 from 3.4 parts of hydrazine hydrate, 85 parts of the 45% aqueous solution of the sodium salt of 2-(2-aminoethyl)aminoethanesulfonic acid, and 60 parts of isophorone diisocyanate dissolved in 60 parts of methoxyethyl acetate. 13 g of butanone oxime were added to the reaction product after termination of the reaction and the mixture was stirred. The dispersion contained 13.9% of the hydrophilic polyurea.

EXAMPLE 4

A solid in stable dispersion was prepared as described in Example 3 in 500 parts of the blocked prepolymer 2 from 3.4 parts of hydrazine hydrate, 85 parts of the 45% aqueous solutions of the sodium salt, and 47 parts of a mixture of 80% of 2,4- and 20% of 2,6-diisocyanatotoluene dissolved in 60 parts of methoxy ethyl acetate. The white dispersion obtained contained 12.6% of the hydrophilic polyurea.

As described at the end of Example 2, self-supporting films were prepared from the dispersions of Examples 3 and 4 and from prepolymer 2 and their permeability to water vapor was determined. The characteristic data of the films and the results of measurements are summarized in Table 2.

TABLE 2

|  | Diamine | Application | Permeability | to water vapor |
|---|---|---|---|---|
|  | (Parts) | (Parts) | (g/m$^2$) | (g/m$^2$ · d) |
| Prepolymer 2 | 100 | 8.0 | 34 | 1050 |
| Example 3 | 100 | 7.4 | 36 | 1400 |

TABLE 2-continued

| | Diamine | Application | Permeability to water vapor |
|---|---|---|---|
| | (Parts) | (Parts) | (g/m$^2$) | (g/m$^2$ · d) |
| Example 4 | 100 | 7.4 | 34 | 1500 |

EXAMPLE 5

A stable dispersion of a solid was prepared as described in Example 1 in 500 parts of a polyurethane urea solution 5 from 1 part hydrazine hydrate, 25.1 parts of the 45% aqueous solution of the sodium salt of 2-(2-aminoethyl)aminoethanesulfonic acid, and 17.7 parts of isophorone diisocyanate dissolved in 20 parts of toluene. The dispersion contained 5.62 of the hydrophilic urea.

EXAMPLE 6

A stable dispersion of solids was prepared as described in Example 5 in 500 parts of the polyurethane urea solution 5 from 1.5 parts of hydrazine hydrate, 28.2 parts of the 45% aqueous solution of the sodium salt, and 15.8 parts of 4,4'-diisocyanato-dicyclohexylmethane dissolved in 16 parts of toluene. The dispersion obtained contained 5.25% of the hydrophilic polyurea.

Self-supporting films are produced from the dispersions of Example 5 and 6 and from the polyurethane urea solution 5 by spreading them on a separating paper by means of a coating knife and then drying (3 minutes/160° C.) and stripping from the separating support. The permeability of the films to water vapor were determined as described at the end of Example 2. The characteristic data of the films and the results of measurements are summarized in Table 3.

TABLE 3

| | Application (g/m$^2$) | Permeability to water vapor (g/m$^2$ · d) |
|---|---|---|
| Polyurethane urea solution 5 | 61 | 1715 |
| Example 5 | 65 | 3155 |
| Example 6 | 66 | 4450 |

EXAMPLE 7

A stable dispersion of solid was prepared as described in Example 1 in 400 parts of a polyurethane solution 4 from 2.8 parts of hydrazine hydrate, 23.1 parts of the 45% aqueous solution of the sodium salt of 2-(2-aminoethyl)aminoethanesulfonic acid, and 19.2 parts of isophorone diisocyanate. The dispersion obtained contained 7.1% of the hydrophilic polyurea.

EXAMPLE 8

A solid in stable dispersion was prepared as described in Example 7 in 500 parts of polyurethane solution 4 from 2.63 parts of hydrazine hydrate, 21.7 parts of the 45% aqueous solution of the sodium salt, and 17.0 parts of 1,6-diisocyanatohexane dissolved in 20 parts of toluene. The dispersion obtained contained 5.1% of the hydrophilic urea.

EXAMPLE 9

A solid in stable dispersion was prepared as described in Example 7 in 500 parts of the polyurethane solution 4 from 1.14 parts of hydrazine hydrate, 28.9 parts of the 45% aqueous solution of the sodium salt, and 15.9 parts of a mixture of 80% of 2,4- and 20% of 2,6-diisocyanatotoluene dissolved in 16 parts of toluene. The dispersion obtained contained 5.3% of the hydrophilic polyurea.

EXAMPLE 10

A solid in stable dispersion was prepared as described in Example 7 in 500 parts of polyurethane solution 4 from 1.51 parts of hydrazine hydrate, 28.2 parts of the 45% aqueous solution of the sodium salt, and 15.8 parts of 4,4'-diisocyanatodicyclohexylmethane dissolved in 16 parts of toluene. The dispersion obtained contained 5.3% of the hydrophilic polyurea.

Self-supporting films were produced from the dispersions of Examples 7 to 10 and from the polyurethane solution 4 as described after Example 6 and their permeability to water vapor was measured. The characteristic data of the films and the results of measurements are summarized in Table 4.

TABLE 4

| | Application (g/m$^2$) | Permeability to water vapor (g/m$^2$ · d) |
|---|---|---|
| Polyurethane solution 4 | 24 | 3200 |
| Example 7 | 29 | 5900 |
| Example 8 | 23 | 6200 |
| Example 9 | 28 | 5700 |
| Example 10 | 22 | 6800 |

EXAMPLE 11

A stable dispersion of solid was prepared as described in Example 1 in 3000 parts of polyacrylate solution 3 of 2.1 parts of hydrazine hydrate, 17.3 parts of the 45% aqueous solution of the sodium salt of 2-(2-aminoethyl)aminoethanesulfonic acid, and 21.2 parts of 4,4'-diisocyanatodicyclohexylmethane dissolved in 120 parts of acetone. The dispersion obtained contained 5.8% of the hydrophilic urea.

EXAMPLE 12

A stable dispersion of solid was prepared as described in Example 11 in 300 parts of the polyacrylate solution 3 from 2.1 parts of hydrazine, 17.3 parts of the 45% aqueous solution of the sodium salt mixed with 60 parts of water and 4.2 parts of triethylamine, and 13.6 parts of 1,6-diisocyanatohexane dissolved in 120 parts of acetone. The dispersion obtained contained 4.4% of the hydrophilic urea.

EXAMPLE 13

A stable dispersion of solid was prepared as described in Example 11 in 300 parts of polyacrylate solution 3 from 2.1 parts of hydrazine hydrate, 17.3 parts of the 45% aqueous solution of the sodium salt mixed with 4.2 parts of triethylamine, and 14.4 parts of isophorone diisocyanate dissolved in 120 parts of ethyl acetate. The dispersion obtained contained 5.1% of the hydrophilic urea.

Self-supporting films were produced from the dispersion of Examples 11 to 13 and from polyacrylate solution 3 as described after Example 6 and their permeability to water vapor was measured. The characteristic data of the films and the results of measurements are summarized in Table 5.

TABLE 5

| | Application (g/m²) | Permeability to water vapor (g/m² · d) |
|---|---|---|
| Polyacrylate solution 3 | 29 | 3000 |
| Example 11 | 32 | 6200 |
| Example 12 | 24 | 5800 |
| Example 13 | 29 | 6000 |

What is claimed is:

1. A process for the preparation of coating compositions comprising preparing a mixture of
(A) 70 to 98% by weight, based on the sum of components (A) and (B), of
   (a) one or more polymers selected from the group consisting of
      (1) a polymer of ethylenically unsaturated monomers and
      (2) a polyurethane or blocked isocyanate prepolymer, and
   (b) optionally, an organic solvent, wherein component (A) contains no free isocyanate groups and no significant quantities of groups capable of reacting with component (B) or with starting materials of component (B) and has a viscosity (determined at 23° C.) of 2000 to 100,000 mPa.s, and wherein the ratio by weight of (a):(b) is from 100:0 to 5:95;
(B) 2 to 30% by weight, based on the sum of components (A) and (B), of a polyaddition product prepared in and dispersed in component (A), wherein said polyaddition product is a polyurethane, a polyurethane urea, or a polyurea, or a mixture thereof, containing hydrophilic groups selected from ionic groups and potentially ionic groups in a quantity corresponding to from 0.5 to 20 milliequivalents per 100 g of component (B) but containing substantially no free isocyanate, hydroxyl, or amino groups, and
(C) optionally, a cross-linking agent;
by forming component (B) in situ in component (A).

2. A process according to claim 1 wherein the mixture contains 80 to 96% by weight of component (A) and 20 to 4% by weight of component (B).

3. A process according to claim 1 wherein the viscosity of component (A) is from 5000 to 70,000 mPa.s.

4. A process according to claim 1 wherein the viscosity of component (A) is from 10,000 to 50,000 mPa.s.

5. A process according to claim 1 wherein component (B) contains ionic groups and/or potentially ionic groups in a quantity corresponding to from 1 to 14 milliequivalents per 100 g of component (B).

6. A coating composition prepared by the process of claim 1.

7. In a method of coating textiles and leather with a coating composition, the improvement wherein the coating composition is a coating composition prepared by the process of claim 1.

* * * * *